May 30, 1967
W. SEIFRIED ET AL
3,322,553
CONTINUOUS PROCESS FOR COATING THERMOPLASTIC POLYESTER
FILMS WITH VINYLIDENE HALIDE COPOLYMERS
Filed Nov. 12, 1964
2 Sheets-Sheet 1
FIG. 1
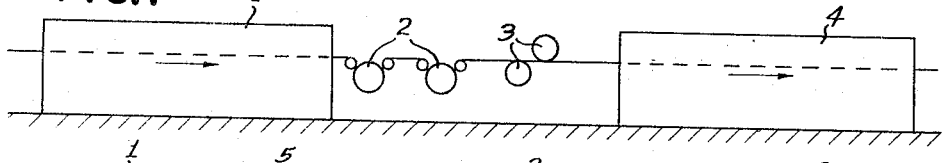
FIG. 1A
FIG. 2
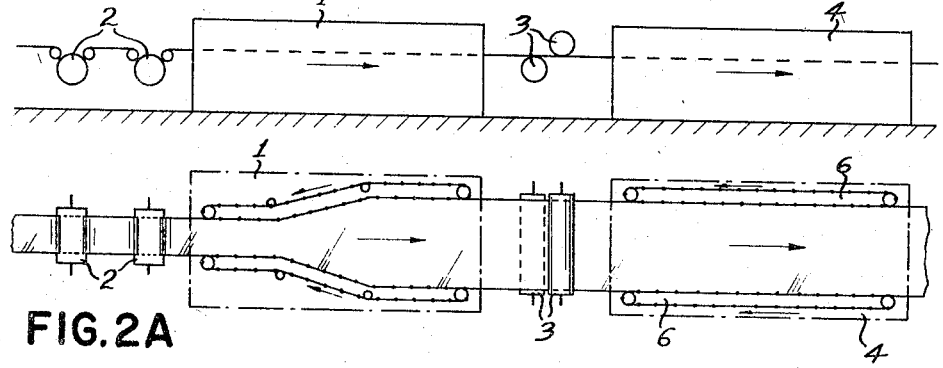
FIG. 2A
FIG. 3
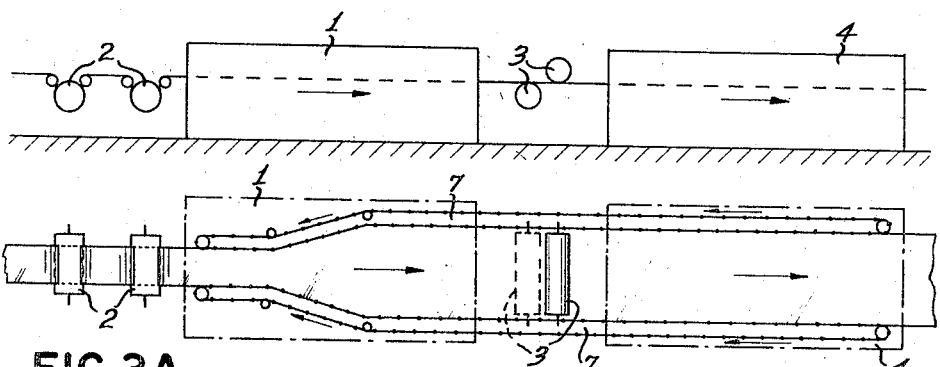
FIG. 3A
INVENTORS
Walter Seifried
Herbert Braunisch
BY Helga Lenhart
James E. Bryan
ATTORNEY

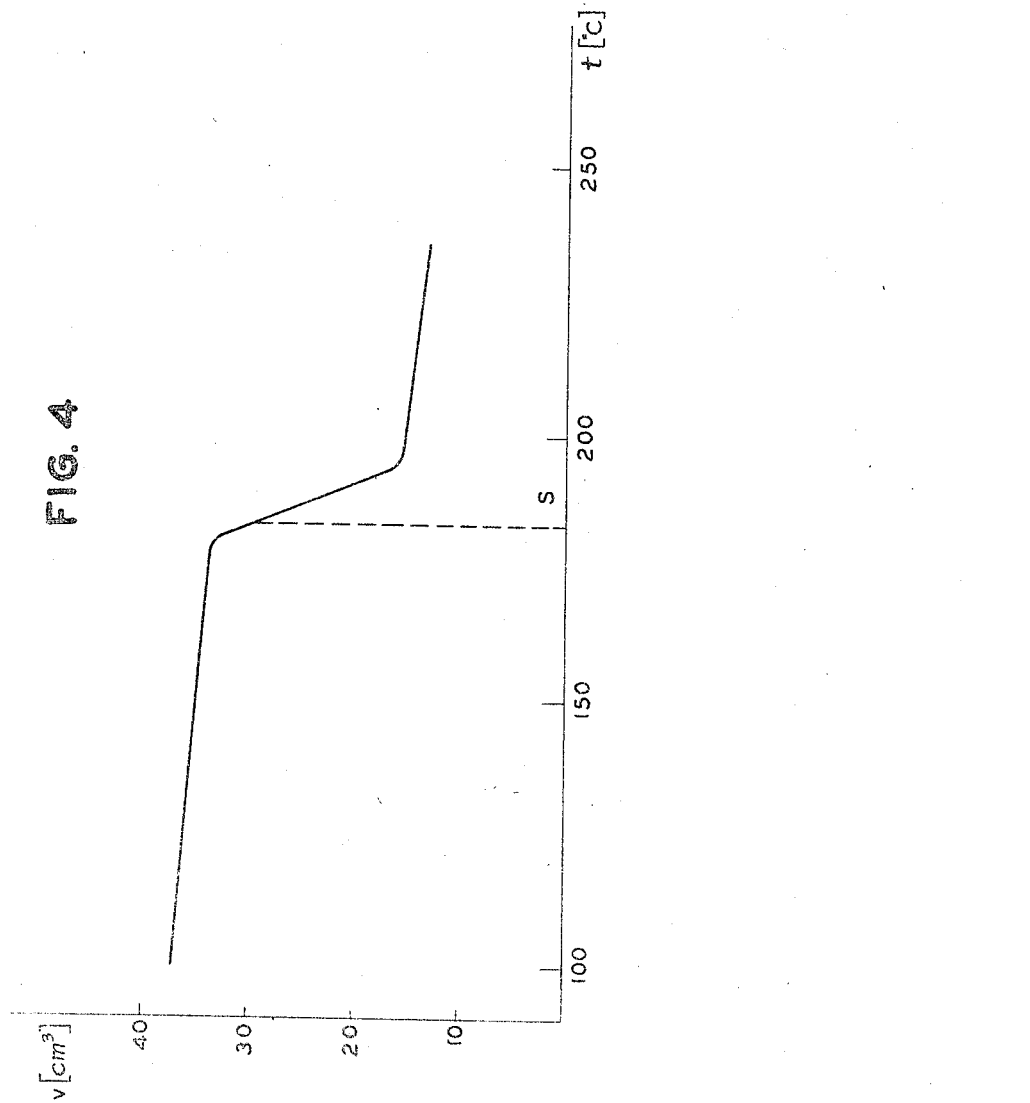

3,322,553
CONTINUOUS PROCESS FOR COATING THERMOPLASTIC POLYESTER FILMS WITH VINYLIDENE HALIDE COPOLYMERS
Walter Seifried and Herbert Braunisch, Wiesbaden-Biebrich, and Helga Lenhart, Wiesbaden, Germany, assignors to Kalle Aktiengesellschaft, Wiesbaden-Biebrich, Germany, a corporation of Germany
Filed Nov. 12, 1964, Ser. No. 410,402
Claims priority, application Germany, Nov. 14, 1963, K 51,366
5 Claims. (Cl. 117—7)

This invention relates to a continuous process for coating thermoplastic polyester films.

It is known that unstretched and stretched thermoplastic films can be coated on one or both sides with polymers obtained by the copolymerization of vinylidene chloride and other polymerizable substances, for example, esters or nitriles of acrylic or methacrylic acid. Films thus coated are distinguished by an increased heat-sealing capacity and reduced gas permeability as compared with uncoated films. In industrial processes, the thickness of coatings is in the range between about 2 and $4\mu$. The application of thicker layers is technically difficult and is not necessary for the purpose for which the films are to be used.

In order to achieve firm adhesion of the coating it has hitherto been necessary either to provide the supporting film with an adhesive prior to coating or to stretch the film after coating. However, considerable drawbacks are associated with both systems. The application of an adhesive generally means that the coated films have to be produced in a discontinuous manner which is both technically cumbersome and uneconomical. The original thickness of the coating, which is between 2 and $4\mu$, is reduced to about 0.1 to $0.8\mu$ by the uniaxial or biaxial stretching. Furthermore, any variations in the thickness of the original coating are substantially accentuated after stretching. For example, gaps may even appear in the coating when supporting films having rough surfaces are stretched after the coating has been applied. In most cases, therefore, the heat-sealing properties and gas impermeability of such inadequately or unevenly coated films do not meet industrial requirements.

The present invention provides a continuous process for coating thermoplastic polyester films with vinylidene halide copolymers in which the above-mentioned drawbacks are obviated. In the process of the invention the film is coated with at least one vinylidene halide copolymer and then heated under tension to a temperature at least equal to the melting or softening temperature of the vinylidene halide copolymer or copolymers.

In the present process, the films may be stretched in many cases, but the coating applied to their surfaces is never stretched. Thus, the thickness of the coating remains unchanged. Furthermore, an adhesive is unnecessary. The desired degree of adhesion between film and coating is achieved at the end of the process by heating the coated film as stated to a temperature at which softening or melting of the vinylidene halide copolymer takes place.

The thermoplastic films to be coated by the process of the invention are made from polyesters or copolyesters obtained by polycondensing aromatic dicarboxylic acids, especially benzene dicarboxylic acids, and lower aliphatic or cycloaliphatic diols. Polyethylene terephthalate films are specially suitable. However, the terephthalic acid in polyethylene terephthalate may be replaced either entirely or partially by one or more other dicarboxylic acids, for example, isophthalic acid, and the ethylene glycol may be replaced either entirely or partially by other diols, for example, propylene glycol, n-butylene glycol, and cyclohexanediol-(1,4). Furthermore, it is also possible to use mixtures of different polyesters.

Substances suitable for use as coatings are high molecular weight compounds prepared by copolymerizing a vinylidene halide and at least one other olefinic unsaturated compound. The vinylidene halide on which such copolymers are based is preferably vinylidene chloride. The copolymerization component is generally a mono-olefinic unsaturated aliphatic monocarboxylic acid or dicarboxylic acid containing not more than 5 carbon atoms, which acid may also be used in the form of its ester prepared with a lower alkanol or in the form of its nitrile. In particular, preference is frequently given to acrylonitrile, acrylic acid methyl ester, methacrylic acid methyl ester, methacrylic acid ethyl ester and itaconic acid. However, the copoymers may also contain other unsaturated carboxylic acids or the esters thereof as polymerization components, for example, maleic acid or crotonic acid. The vinylidene halide component is advantageously present in the copolymer compounds in a molar excess and may constitute, for example, up to 95 percent by weight of the copolymer. Mixtures of these copolymers are also suitable for coating purposes.

The process is advantageously carried out in a manner such that, in one operation, the film is first stretched, then immediately coated and then heated, the temperature applied being such that the film is also heat-set. The film is first stretched monoaxially or biaxially in known manner in a stretching zone, in which process the film may be either stretched first longitudinally and then transversely or first transversely and then longitudinally. The film then travels through the coating zone. In this zone the copolymer compound is applied to one or both sides of the film, by means of an appropriate device, for example by means of rolls or by immersion, advantageously in a dispersion, especially an aqueous dispersion that may contain a lubricant, for example dispersed polyvinyl chloride, or other additives conventionally used in film processing. The coated film, which is still wet, finally passes through the heating zone in which the temperature is above the melting or softening point of the copolymer. The film is conducted into the heating zone under tension, this being achieved, for example, by means of a clip stenter. This procedure prevents any noticeable longitudinal or transverse shrinkage of the film during the heat treatment. In this zone, the layer that has been applied is dried and anchored to the film. In most cases, heat-setting of the film also takes place in this zone, provided that the temperature of the heating zone is so selected that heat-setting of the film material under treatment is possible. As is known, the heat-setting temperatures for polyesters are in the range between 130 and 220° C. If the film is made of polyethylene terephthalate, temperatures between 150 and 220° C., but especially between 200 and 220° C., are preferred.

However, it is not absolutely essential that drying and anchoring of the coating in the heating zone be coupled with the heat-setting of the film. Thus a film may first be stretched and heat set and then coated in accordance with the invention. In this case, of course, the temperature in the heating zone may be lower than the heat-setting temperature. However, in order to ensure that the coated film acquires the properties desired, namely a high degree of adhesion and the lowest possible degree of gas permeability, it is also essential in this case that the temperature in the heating zone be at least as high as the melting or softening temperature of the copolymer used. In this case, too, it is essential that the film should travel under tension, for example, on a clip stenter, in order to prevent distortion.

The coated film should be subjected to the temperatures indicated long enough to allow as complete a removal of the dispersion liquid as possible. The time of residence is generally between a few seconds and a few minutes, but preferably below one minute.

Coatings applied to films by the process of the invention adhere surprisingly well and can not be removed by simple mechanical means or by prolonged boiling. Such coatings are also of the optimum thickness of 2 to 4μ. Thus, coated films prepared in accordance with the invention display very good heat-sealing properties and very good gas impermeability. When, for example, polyethylene terephthalate is used as the supporting film and the coated film is heated to a temperature above the melting point of the copolymer, a material is obtained which is resistant to boiling and displays a degree of gas permeability that is only about half that of polyethylene terephthalate coated in a conventional manner. Furthermore, the process offers a substantial economic advantage in that the film need not be subjected to a special drying process after coating, since drying, anchoring and, if necessary, setting, are carried out in one operation.

By virtue of these special properties, the coated films can be used for a variety of purposes; in particular, they can be used in the preparation of magnetic sound recording tapes and also for packaging commodities and foodstuffs that are sensitive to moisture, for example, packaged, read-to-cook food.

One embodiment of apparatus suitable for use in the process of the invention is illustrated in the accompanying drawings in which:

FIGURES 1 to 3 and FIGURES 1A to 3A, each illustrates in sectional elevation and plan vews, respectively, a different apparatus for such use, heat-setting being effected in each case, and, FIGURE 4 is a curve showing the decrease in gas permeability of a film coated by the process of the invention with increasing temperature in the heating zone.

Referring to the drawing, FIGURES 1 and 1A show an apparatus in which biaxially stretched films are produced by a method in which the film is first stretched transversely, then longitudinally, and then heat-set, the film being transported by a clip stenter during transverse stretching and heat-setting. After the longitudinal stretching and prior to setting, the film is coated. The transverse stretching unit is shown at 1, 2 is the longitudinal stretching unit, 3 are rolls for applying the dispersion of the copolymer compound, 4 is a heat-setting stenter and 5 and 6 the clip chains of the respective stenters.

FIGURES 2 and 2A show an arrangement in which, in contrast to that shown in FIGURES 1 and 1A, the film is first stretched longitudinally, then transversely, and then set. The stenter clip chains transporting the film are disposed as in FIGURES 1 and 1A and are similarly used in the transverse stretching and setting operations. The numerals 1 to 6 indicate the same parts as in FIGURES 1 and 1A.

FIGURES 3 and 3A show an arrangement for producing biaxially stretched films in which the film is first stretched longitudinally, then transversely and then set, but in which it is not released from the stenter clips during passage between the transverse stretching zone and the heat-setting zone, which is in contrast to the system shown in FIGURES 2 and 2A. The film is thus held by stenter clips during the coating process. The numerals 1 to 4 indicate the same parts of the assembly as in FIGURES 1 and 1A. The numeral 7 indicates the continuous stenter clip chains.

Monoaxially stretched films can be coated by the process of the invention on the same type of apparatus, the difference being that in any particular case the first stretching stage is omitted.

In FIGURE 4, the abscissa indicates the temperature $t$ (° C.) and the ordinate indicates the volume of gas $v$ in cubic centimeters that permeates through one square meter of the coated film in the course of 24 hours. The film used was a biaxially stretched polyethylene terephthalate film, the coating was a copolymer of vinylidene chloride and methylacrylic acid methyl ester and the gas used was carbon dioxide. It can be seen that at operating temperatures below the melting point of the copolymer, the gas permeability is between 30 and 40 cubic centimeters per square meter in 24 hours, which is relatively high. It drops sharply when the operating temperature is in the region of the melting point of the copolymer compound, and becomes as low as between 10 and 20 cubic centimeters per square meter in 24 hours when the operating temperature is sufficiently above the melting point of the copolymer compound.

The following examples further illustrate the invention:

Example 1

A biaxially stretched polyethylene terephathlate film that has not yet been heat-set, having a thickness of 25μ, is coated on one side with an aqueous dispersion of a vinylidene chloride copolymer derived from 91.5 percent by weight of vinylidene chloride, 1 percent by weight of acrylonitrile, 6 percent by weight of methacrylic acid methyl ester and 1.5 percent by weight of itaconic acid and having a molecular weight $M>100,000$. The solids content of the dispersion is 46 percent. The coated film is then heated for 10 seconds at 200° C. The film thus treated bears a uniform, cohesive coating about 3μ thick. It is clear, firmly anchored to the film, capable of being heat-sealed and resistant to boiling.

Example 2

A biaxially stretched polyethylene terephthalate film that is not heat-set, having a thickness of 2.5μ, is coated on both sides with a dispersion having the same composition as the dispersion described in Example 1, and then heat-set at 200° C. The film thus treated bears a uniform, cohesive coating about 3μ thick on both sides. It is especially suitable for the manufacture of magnetic sound recording tape because, in addition to the properties described in Example 1, it possesses especially good dimensional stability.

It will be obvious to those skilled in the art the many modifications may be made within the scope of the present invention without departing from the spirit thereof, and the invention includes all such modifications.

What is claimed is:

1. A process which comprises coating a thermoplastic polyester film with at least one vinylidene halide copolymer, which copolymer contains a predominant amount of vinylidene chloride, and heating the coated film to a temperature in the range of 150 to 220° C., to thereby anchor the coating to the film and to heat-set the film.

2. A process according to claim 1 in which the vinylidene halide is copolymerized with a compound selected from the group consisting of acrylonitrile, acrylic acid methyl ester, methacrylic acid methyl ester, methacrylic acid ethyl ester, and itaconic acid.

3. A process according to claim 1 in which the vinylidene halide copolymer is applied in the form of an aqueous dispersion.

4. A process according to claim 1 in which the thermoplastic polyester film is biaxially stretched polyethylene terephthalate.

5. A process according to claim 4 in which the biaxially stretched polyester film is coated on at least one side and heated under tension.

References Cited

UNITED STATES PATENTS

| | | | |
|---|---|---|---|
| 2,762,720 | 9/1956 | Michel | 117—138.8 |
| 2,805,963 | 9/1957 | Gaylord | 117—138.8 |

WILLIAM D. MARTIN, *Primary Examiner.*

H. W. MYLIUS, R. HUSACK, *Assistant Examiners.*